(12) United States Patent
Tallgren et al.

(10) Patent No.: US 8,990,384 B2
(45) Date of Patent: Mar. 24, 2015

(54) MOBILE DEVICE CONTROLLED BY CONTEXT AWARENESS

(75) Inventors: Markus Tallgren, Espoo (FI); Joni Niemi, Luhtikyla (FI)

(73) Assignee: Adfore Technologies Oy, Espoo (FI)

( * ) Notice: Subject to any disclaimer, the term of this patent is extended or adjusted under 35 U.S.C. 154(b) by 162 days.

(21) Appl. No.: 13/509,298

(22) PCT Filed: Nov. 9, 2010

(86) PCT No.: PCT/FI2010/050901
§ 371 (c)(1),
(2), (4) Date: Jun. 28, 2012

(87) PCT Pub. No.: WO2011/058224
PCT Pub. Date: May 19, 2011

(65) Prior Publication Data
US 2012/0271913 A1    Oct. 25, 2012

(30) Foreign Application Priority Data

Nov. 11, 2009  (FI) ..................................... 20096172

(51) Int. Cl.
*G06F 15/16* (2006.01)
*G06F 15/173* (2006.01)
(Continued)

(52) U.S. Cl.
CPC .............. *H04W 24/00* (2013.01); *H04W 4/001* (2013.01); *H04W 4/02* (2013.01); *H04W 88/02* (2013.01)
USPC ........... 709/224; 709/204; 709/205; 709/206; 709/207; 709/217; 709/218; 709/219; 709/223; 709/225; 709/227; 709/228; 709/229

(58) Field of Classification Search
USPC ................ 709/204–207, 217–219, 223–225, 709/227–229
See application file for complete search history.

(56) References Cited

U.S. PATENT DOCUMENTS 7,293,013 B1 * 11/2007 Horvitz et al. ................ 707/694
7,305,437 B2 * 12/2007 Horvitz et al. ................ 709/204
(Continued)

FOREIGN PATENT DOCUMENTS

FI          20095570 A       9/2009
KR       2008 0052158 A      6/2008
(Continued)

OTHER PUBLICATIONS

Finnish Search Report, dated Jul. 14, 2010, from corresponding Finnish application.
(Continued)

*Primary Examiner* — Edward Kim
(74) *Attorney, Agent, or Firm* — Yong & Thompson

(57) ABSTRACT

A method for controlling a mobile device on the basis of context awareness includes: recognizing (101) changes of context related to the mobile device and/or a user of the mobile device, gathering (102) usage data indicative of control actions given by the user and directed to the mobile device during different recognized changes of context, selecting (103), as a response to a change of context, at least one service action from among a pre-determined set of service actions related to services provided with the mobile device at least partly on the basis of the usage data, and controlling (104) the mobile device to perform the selected at least one service action, e.g. adaptation of a user interface of the mobile device. As a consequence of gathering the usage data, the operation of the mobile device in different changes of context can be tailored for the user.

43 Claims, 8 Drawing Sheets

(51) Int. Cl.
  *H04W 24/00* (2009.01)
  *H04W 4/00* (2009.01)
  *H04W 4/02* (2009.01)
  *H04W 88/02* (2009.01)

(56) References Cited

U.S. PATENT DOCUMENTS

| | | | |
|---|---|---|---|
| 8,681,984 B2 * | 3/2014 | Lee et al. | 380/258 |
| 2002/0167488 A1 | 11/2002 | Hinckley et al. | |
| 2003/0187984 A1 | 10/2003 | Banavar et al. | |
| 2004/0002932 A1 * | 1/2004 | Horvitz et al. | 706/46 |
| 2006/0010206 A1 * | 1/2006 | Apacible et al. | 709/205 |
| 2006/0031288 A1 * | 2/2006 | Ter Horst et al. | 709/204 |
| 2007/0250628 A1 * | 10/2007 | Katoh et al. | 709/225 |
| 2009/0070283 A1 * | 3/2009 | Kang et al. | 706/45 |
| 2009/0271148 A1 | 10/2009 | Jeong et al. | |
| 2012/0059780 A1 * | 3/2012 | Kononen et al. | 706/14 |

FOREIGN PATENT DOCUMENTS

| | | |
|---|---|---|
| WO | 2008/109477 A1 | 9/2008 |
| WO | 2008/140358 A1 | 11/2008 |

OTHER PUBLICATIONS

International Search Report, dated Mar. 17, 2011, from corresponding PCT application.
International Preliminary Report on Patentability, dated Jan. 5, 2012, from corresponding PCT application.

* cited by examiner

MOBILE DEVICE CONTROLLED BY CONTEXT AWARENESS

FIELD OF THE INVENTION

The invention relates generally to mobile devices. More particularly, the invention relates to a method for controlling a mobile device on the basis of context awareness and to a mobile device arranged to be controlled by context awareness. Furthermore, the invention relates to a computer program for controlling a mobile device on the basis of context awareness.

BACKGROUND

Many mobile devices, such as for example a mobile phone, a personal digital assistant (PDA), a smart-phone, a lap-top computer, and a wrist-top device, contain and/or are connected to sensors that may be configured to provide real-time sensing data on the surrounding environment and/or the user of the mobile device. Based on the collected sensing data it is possible to deduce the current context, i.e. the state of the physical environment, the state of the mobile device itself, and/or the physiological state of the user, for example. The information about the context and changes in the context can be utilized in implementing context-aware applications such as for example context-sensitive user interfaces of mobile devices.

The challenges in implementing the context-aware applications are two-fold. Firstly, the changes of context should be recognized in a manner that the recognized context corresponds sufficiently well to the real-life situation concerning e.g. the state of the physical environment, the state of the mobile device itself, and/or the physiological state of the user. Publication FI20095570 discloses an adaptive context recognition algorithm which may be initially trained by e.g. supervised adaptation process on the basis of available sensing data vs. indicated context information. The information needed for the supervised adaptation process may be, for example, data collected from a plurality of different users and it may thus provide a generally applicable initial state of the algorithm. After the initial adaptation process described above the algorithm may work reasonably well on average. Thereafter, on-line/run-time adaptation may take place upon receiving feedback by the user of the mobile device. The second challenge in implementing the context-aware applications relates to using the information provided by the context recognition for controlling the mobile device in such a manner that the service actions taken as a response to a recognized change of context correspond sufficiently well to the needs of the user. The service actions are related to services provided with the mobile device and they can be, for example, adaptation of the user interface of the mobile device, adaptation of an application, adaptation of a menu, adaptation of a profile, adaptation of a mode, trigger an application, and/or close an application. Publication US2002167488 discloses a mobile device that includes at least one sensor, such as a tilt sensor implemented by an accelerometer, which provides contextual information, e.g. whether the mobile device is being held or not. When the mobile device receives an incoming message, or notification, the device responds thereto based at least in part upon the contextual information. The control of the mobile device may work reasonably well on average when a sufficiently big group of users is under inspection but, in conjunction with a single user, the operation may, in some situations, be unsatisfactory.

SUMMARY

In accordance with the first aspect of the invention there is provided a new mobile device arranged to be controlled by context awareness. The mobile device according to the invention comprises a processing system arranged to:
  recognize a change of context related to the mobile device and/or a user of the mobile device,
  gather usage data indicative of control actions given by the user and directed to the mobile device during different recognized changes of context,
  as a response to recognizing a change of context, select at least one service action at least partly on the basis of the usage data, the at least one service action being selectable from among a pre-determined set of service actions related to services provided with the mobile device, and
  control the mobile device to perform the selected at least one service action.

As the selection of the service action is based at least partly on the usage data indicative of control actions given by the user and directed to the mobile device during different recognized changes of context, the selection can be personalized to correspond to earlier behavior of the user of the mobile device. For example, if the recognized change of context is an arrival at a place on which the user has typically loaded a certain web-page, the corresponding piece of the usage data may be arranged to indicate that the service action to be selected as a response to the above-mentioned change of context is downloading the above-mentioned web-page. The above-mentioned place can be e.g. a bus-stop in the vicinity of the user's home and the above-mentioned web-page can be e.g. a time schedule of a bus operator. The above-mentioned change of context can be recognized e.g. on the basis of a positioning signal provided by a GPS-receiver (Global Positioning System) contained by or connected to the mobile device.

In accordance with the second aspect of the invention there is provided a new method for controlling a mobile device on the basis of context awareness. The method according to the invention comprises:
  recognizing a change of context related to the mobile device and/or a user of the mobile device,
  gathering usage data indicative of control actions given by the user and directed to the mobile device during different recognized changes of context,
  as a response to recognizing a change of context, selecting at least one service action at least partly on the basis of the usage data, the at least one service action being selected from among a pre-determined set of service actions related to services provided with the mobile device, and
  controlling the mobile device to perform the selected at least one service action.

In accordance with the third aspect of the invention there is provided a new computer program for controlling a mobile device on the basis of context awareness. The computer program according to the invention comprises instructions executable by a programmable processor for controlling the programmable processor to:
  recognize a change of context related to the mobile device and/or a user of the mobile device,
  gather usage data indicative of control actions given by the user and directed to the mobile device during different recognized changes of context,
  as a response to recognizing a change of context, select at least one service action at least partly on the basis of the usage data, the at least one service action being selectable from among a pre-determined set of service actions related to services provided with the mobile device, and control the mobile device to perform the selected at least one service action.

A computer program product according to the invention comprises a computer readable medium, e.g. a compact disc (CD) or a random access memory (RAM), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF THE EXEMPLIFYING EMBODIMENTS

Figure 1:
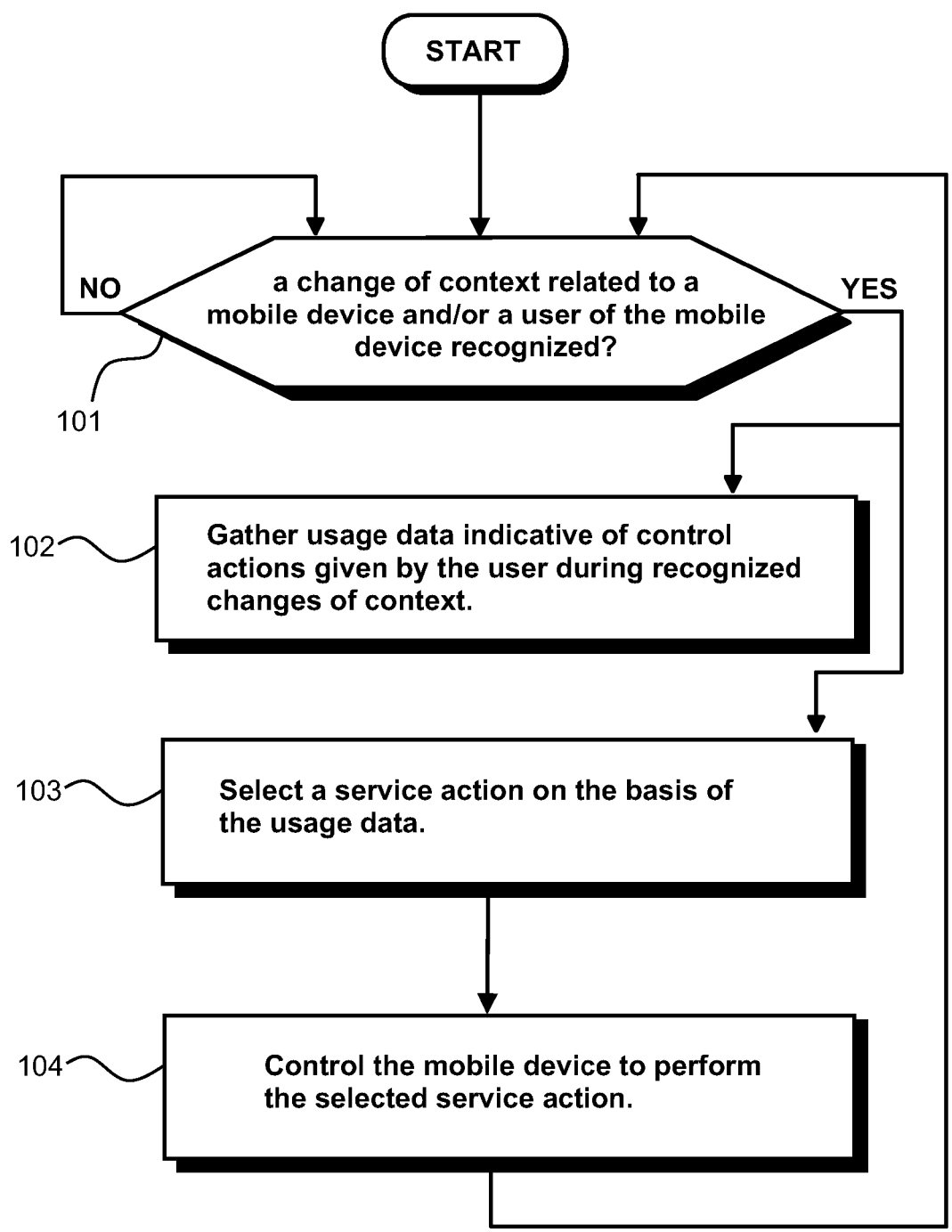
FIG. 1 shows a flow chart of a method according to an embodiment of the invention for controlling a mobile device on the basis of context awareness.

FIG. 1 shows a flow chart of a method according to an embodiment of the invention for controlling a mobile device on the basis of context awareness. The mobile device can be, for example a mobile phone, a personal digital assistant (PDA), a smart-phone, a lap-top computer, or a wrist-top device. The mobile device may include integrated and/or at least functionally, i.e. wirelessly or in a wired manner, connected sensing entities such as various sensors providing the necessary measurement, or "raw", sensing data for context recognition. The sensing entities may contain specific hardware, such as sensors sensing some physical quantity, and/or specific software to acquire the predetermined sensing data. Some sensing entities may be substantially software-based such as entities acquiring data related to the data stored in the mobile device such as calendar data or device (sw) status data. The sensing entities may include one or more sensors such as accelerometers, temperature sensors, location sensors such as a GPS (Global Positioning System) receiver, pulse/heart rate sensors, and/or photometers. Based on the collected sensing data, a change in the current context is deduced, i.e. a change in the state of the physical environment, in the state of the mobile device itself, and/or in the physiological state of the user, for example.

The method comprises recognizing, in a phase 101, a change of context related to the mobile device and/or a user of the mobile device. The recognition of the change of context can be based on any suitable context recognition algorithm, and some examples will be given later in this document. The recognized change of context may be, for example, an arrival at a place having certain coordinates and it may happen that, after arriving at that place, a user of the mobile device makes the mobile device to download a certain web-page. The aforesaid place can be e.g. a bus-stop and the aforesaid web-page may be e.g. a time schedule of a bus operator. The above-mentioned exemplifying change of context: "the arrival at the aforesaid place" and the exemplifying control action given by the user: "making the mobile device to download the web-page" constitute an exemplifying item of usage data indicative of control actions given by the user and directed to the mobile device during different recognized changes of context. After a change of context has been recognized in the phase 101, it is preferably monitored whether the user of the mobile device gives any control actions directed to the mobile device and, in a case the user gives a control action, a new item of the usage data is gathered in a phase 102. The length of a time interval after the change of context and during which it is monitored whether the user of the mobile device gives any control actions can be used as a settable parameter of the gathering functionality. It is also possible to record the time difference between the change of context and the subsequent control operation, this time difference being indicative of strength of correlation between the change of context and the subsequent control operation. As response to the recognized change of context, the following actions are carried out in parallel with the gathering the usage data:

selecting, in a phase 103, at least one service action at least partly on the basis of the usage data, the at least one service action being selectable from among a pre-determined set of service actions related to services provided with the mobile device, and controlling, in a phase 104, the mobile device to perform the selected at least one service action.

The selected service action may be, for example, downloading a certain web-page, e.g. the time schedule of the bus operator, as a response to a situation in which the change of context is an arrival at the place having certain coordinates, e.g. a bus-stop, and the usage data contains a data item indicative of correlation between this change of context and this service action. The data item of the usage data may have been gathered, the phase 102, when the user has previously arrived at the aforesaid place. The above-mentioned change of context can be recognized e.g. on the basis of a positioning signal provided by a GPS-receiver contained by or connected to the mobile device. As the selection of the service action is based at least partly on the usage data indicative of earlier control actions given by the user and directed to the mobile device during different recognized changes of context, the selection of the service action can be personalized to correspond to the earlier behavior of the user.

The service action can be, for example, one of the following: adaptation of the user interface of the mobile device, adaptation of an application, adaptation of a menu, adaptation of a profile, adaptation of a mode, trigger an application, close an application, bring forth an application, bring forth a view, minimize a view, activate or terminate a keypad lock, establish a connection, terminate a connection, transmit data, send a message, trigger audio output such as playing a sound, activate tactile feedback such as vibration, activate the display, input data to an application, download a web-page, download a file, upload a file, shut down the mobile device. It should be noted that the above list includes only examples and it is not exhaustive.

Figure 2:
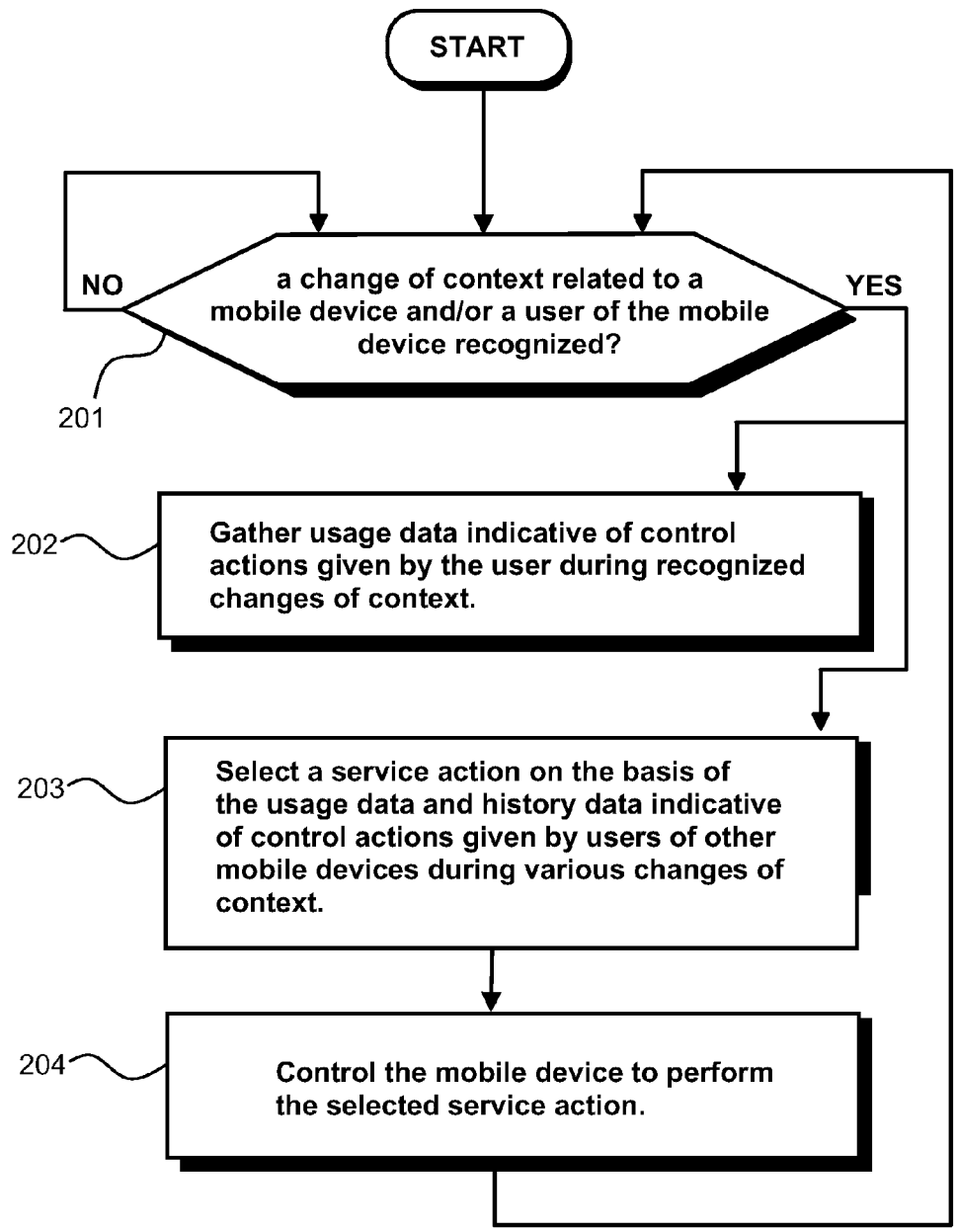
FIG. 2 shows a flow chart of a method according to an embodiment of the invention for controlling a mobile device on the basis of context awareness.

FIG. 2 shows a flow chart of a method according to an embodiment of the invention for controlling a mobile device on the basis of context awareness. Phases 201, 202 and 204 are similar to the phases 101, 102 and 104 of the method illustrated in FIG. 1. In the method shown in FIG. 2, the at least one service action is selected in a phase 203 using, in addition to the usage data, history data indicative of control actions given by users of other mobile devices during different changes of context related to the other mobile devices and/or the users of the other mobile devices. The history data can be downloaded to the mobile device from an external device and/or received via a mobile communication network. The history data is especially useful when amount of the usage data gathered in the phase 202 is still low, i.e. the mobile device has been used so short time that a significant usage data has not been gathered yet.

Figure 3:
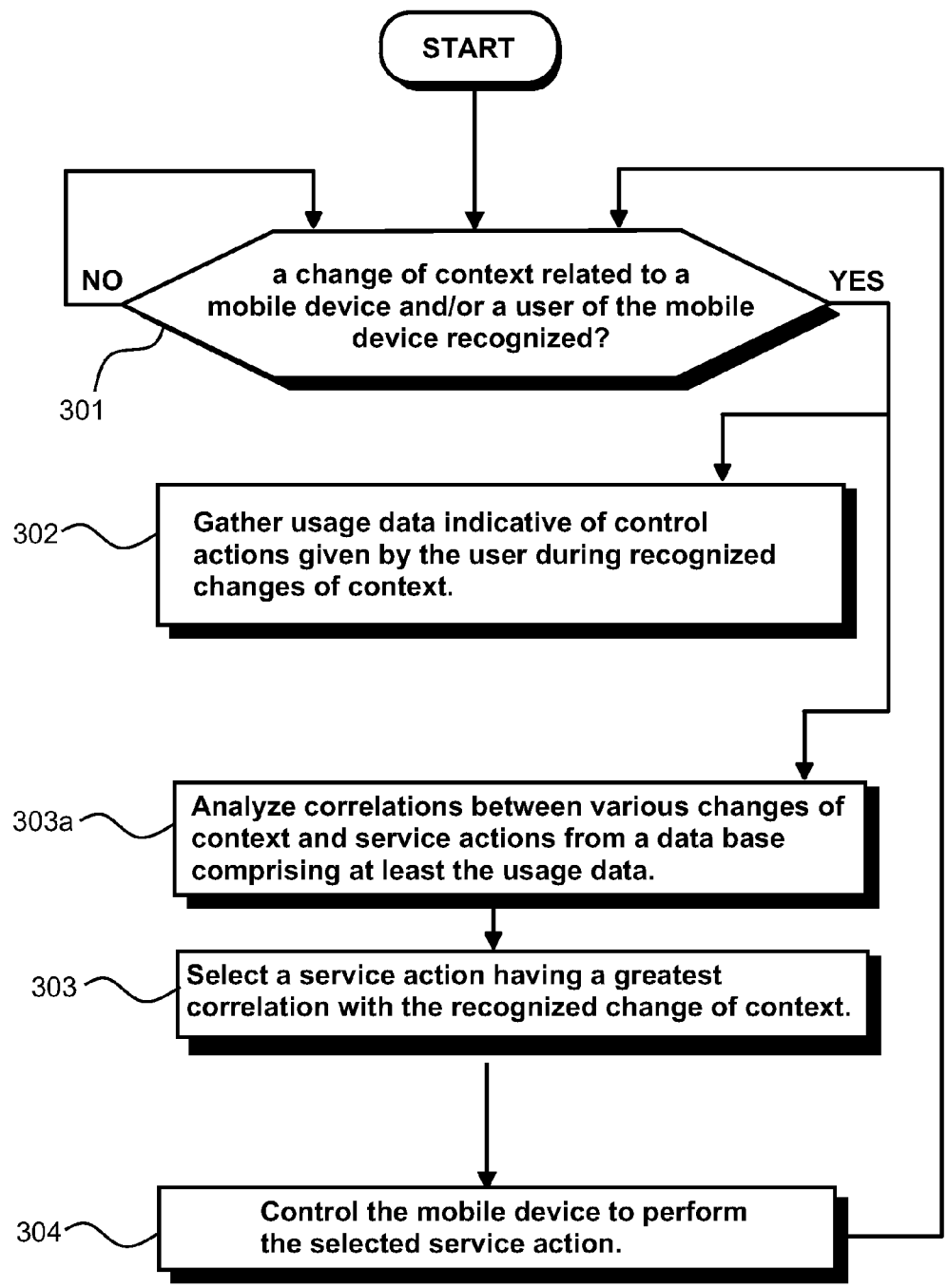
FIG. 3 shows a flow chart of a method according to an embodiment of the invention for controlling a mobile device on the basis of context awareness.

FIG. 3 shows a flow chart of a method according to an embodiment of the invention for controlling a mobile device on the basis of context awareness. Phases 301, 302 and 304 are similar to the phases 101, 102 and 104 of the method illustrated in FIG. 1. The method shown in FIG. 3 comprises analyzing, in a phase 303a, correlations between different changes of context and different service actions from a data base comprising the usage data and possibly also the history data. A phase 303 comprises selecting a service action that has greatest correlation with the recognized change of context. The correlations may be analyzed for example with a standard frequency analysis or with sophisticated data mining algorithms.

Figure 4:
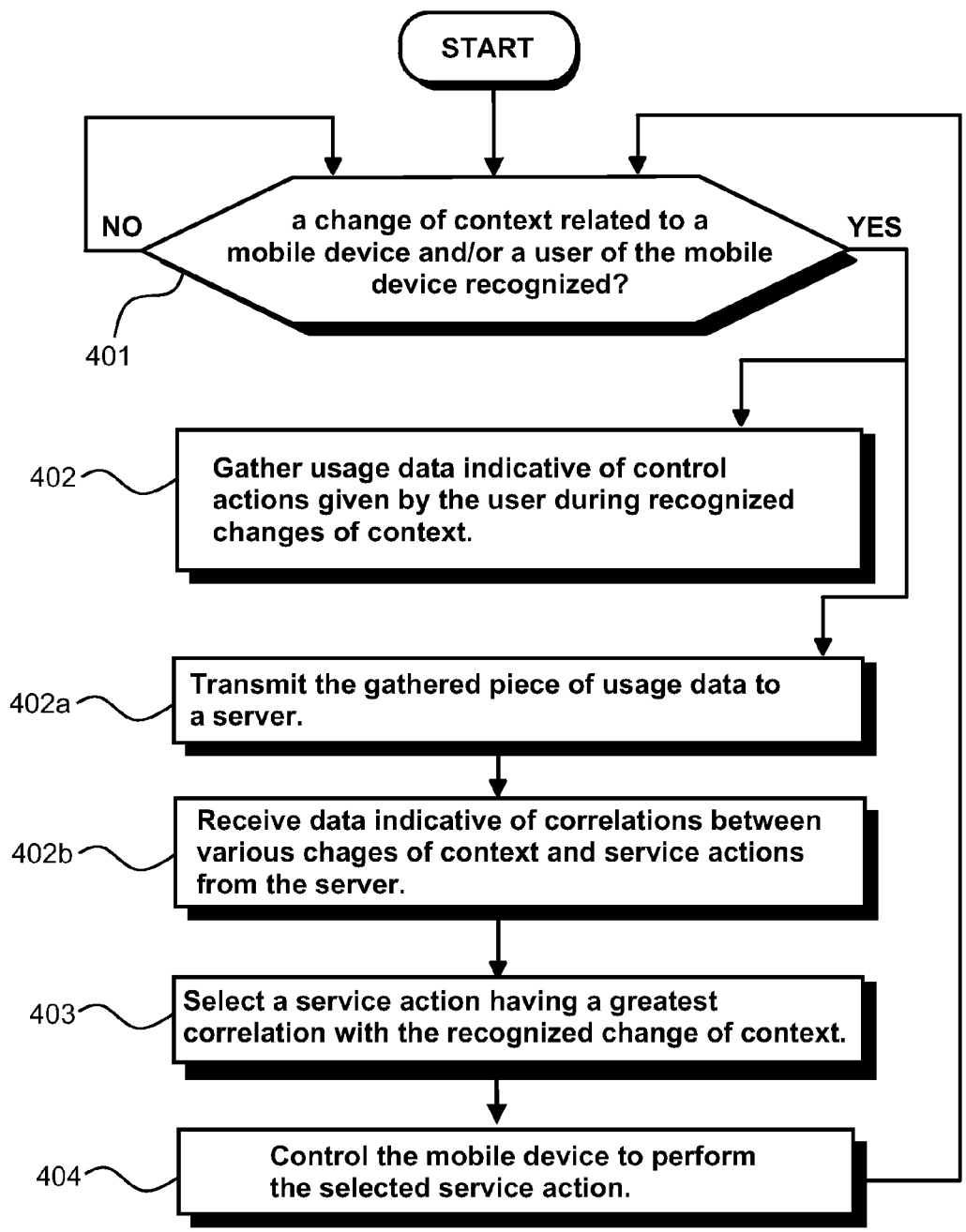
FIG. 4 shows a flow chart of a method according to an embodiment of the invention for controlling a mobile device on the basis of context awareness.

FIG. 4 shows a flow chart of a method according to an embodiment of the invention for controlling a mobile device on the basis of context awareness. Phases 401, 402, 403 and 404 are similar to the phases 301, 302, 303 and 304 of the method illustrated in FIG. 3. The method shown in FIG. 4 comprises transmitting, in a phase 402a, a gathered usage data item to a server device via a mobile communication network and receiving, in a phase 402b, data indicative of correlations between various possible changes of context and various possible selectable service actions. Therefore, the analysis of the usage data and possibly also of the history data is carried out in the server device instead of the mobile device. Hence, the mobile device is not self-contained as to the method illustrated in FIG. 4, but the computational, memory, and battery resources of the mobile device can be spared instead.

Figure 5:
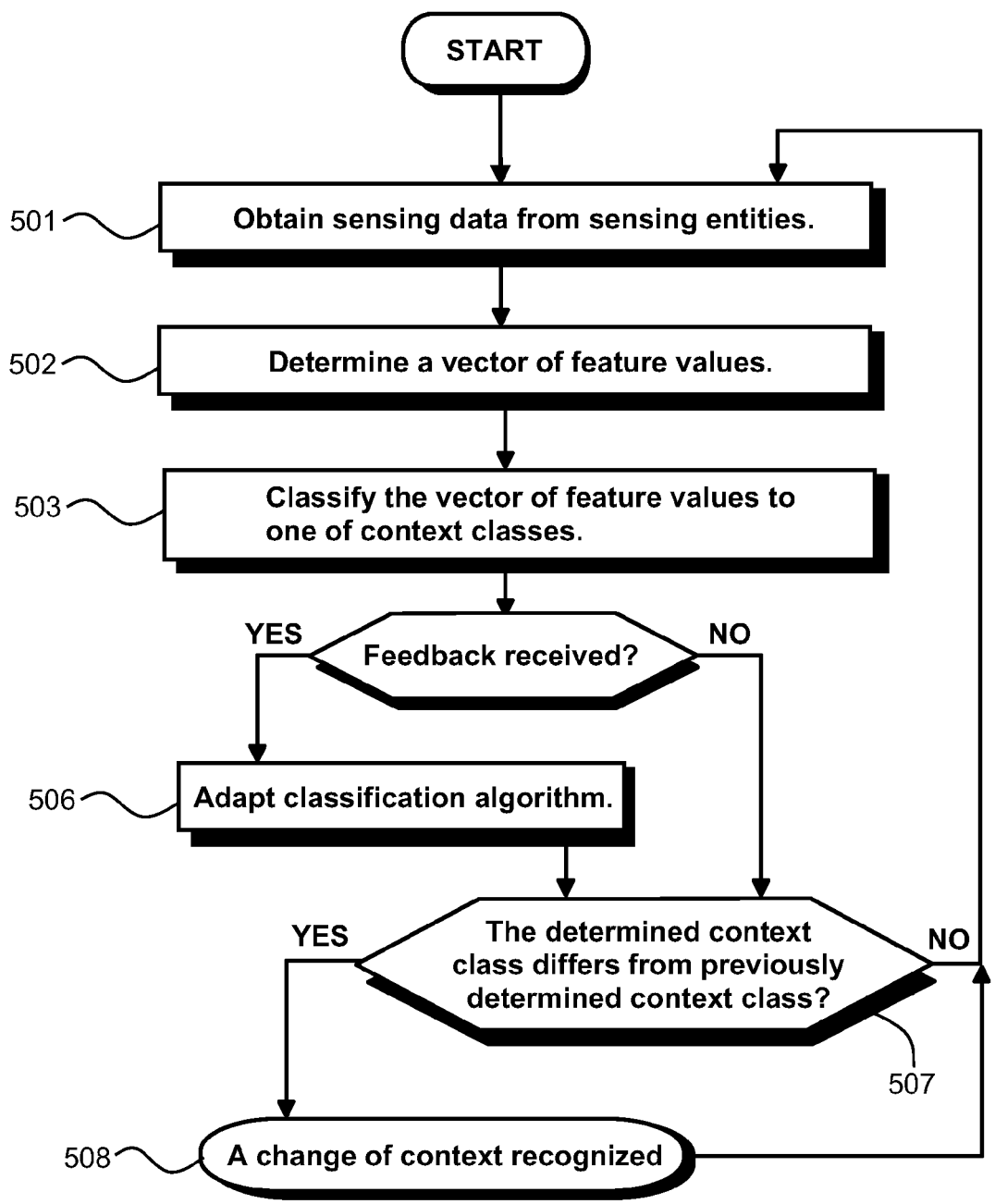
FIG. 5 shows a flow chart of a recognizing method for recognizing a change of context, the recognizing method being usable in a method according to an embodiment of the invention for controlling a mobile device on the basis of context awareness.

FIG. 5 shows a flow chart of a recognizing method for recognizing a change of context. The recognizing method is usable in a method according to an embodiment of the invention for controlling a mobile device on the basis of context awareness. The recognizing method shown in FIG. 5 can be used, for example, as the phases 101, 201, 301, and 401 of the methods illustrated in FIGS. 1-4. It is also possible to use the recognizing method illustrated in FIG. 5 in conjunction with other applications wherein the context and/or the change of context needs to be recognized. The recognizing of the change of context comprises:

obtaining, in a phase 501, sensing data from sensing entities such as, for example, accelerometers, temperature sensors, location sensors, pulse/heart rate sensors, photometers, entities for acquiring data related to the data stored in the mobile device, and/or entities for acquiring device status data, determining, in a phase 502, a vector of feature values on the basis of the sensing data provided by the sensing entities, and classifying, in a phase 503, the vector of feature values to one of pre-defined alternative context classes.

The change of context is present, a result phase 508, when the context class determined by the classification of the vector of feature values differs from a previously determined context class; a decision phase 507. The previously determined context class is the context class recognized after the previous change of context. The determination of the vector of feature values and the classification, the phases 502 and 503, are described below only in view of general principles. A more detailed description for these method phases can be found e.g. in FI20095570.

For the classification it is possible use a vast number of different features the values of which are determined on the basis of the sensing data. However, it is both computationally and memory-wise advantageous to use as few of features as possible in the actual classification. Determining feature values from the sensing data typically requires certain computation and it is even possible to attain suboptimal results, if too many features are used. Preferably, substantially linearly separable features are selected for the classification. The Sequential Forward Selection (SFS) is an exemplifying method for feature selection that can be applied in conjunction with the method shown in FIG. 5. The basic principle in the SFS-algorithm is to add a feature that increases the classification accuracy most to the current pool of features at each step. Hence, the SFS-algorithm performs optimization in the feature space. Another exemplifying method is the Sequential Backward Selection (SBS) that starts with the full set of features and gradually removes features from the pool. As a further example, in Sequential Floating Forward Selection (SFFS) the procedure includes two parts. A new feature for the subset is added by the SFS-method. The worst feature is then conditionally excluded until no improvement is made to the previous sets. This method avoids the nesting effect of the SFS-method, in which the discarded features cannot be selected anymore. The inclusion and exclusion of a feature is deduced using a criterion value. It can be e.g. a distance measure or a classification result. To explain the algorithm more thoroughly, a new feature, which gives the best criterion with the previously selected features, is added to the feature subset according to the SFS-method. A conditional exclusion is applied to the new feature set, from which the least significant feature is determined. If the least significant feature is the last one added, the algorithm goes back to selecting a new feature by the SFS-method. Otherwise the least significant feature is excluded and moved back to the set of available features and conditional exclusion is continued. Again, the least significant feature is determined and the criterion without this feature is compared to the criterion with the same number of features in the memory. If the criterion is improved, the feature is excluded and moved back to the set of available features and this step is repeated until no further improvement is made. The cycle starts all over again by adding a new feature until the previously defined subset size is reached.

Table 1 presents an exemplifying set of features which can be used for distinguishing the following exemplifying activities from each others: outdoor bicycling, soccer playing, lying, nordic walking, rowing with the rowing machine, running, sitting, standing, and walking. The sensing entities are acceleration sensors attached to the wrist and hip of the user.

TABLE 1

An exemplifying set of features for classification.

| Feature | Explanation |
| --- | --- |
| Hip acceleration, Y-direction, MinMax | Difference between Min and Max |
| Hip acceleration, X-direction, MinMax | Difference between Min and Max |
| Hip acceleration, Y-direction, Min | |
| Hip acceleration, X-direction, Min | |
| Hip acceleration, Y-direction, Mean | |
| Hip acceleration, X-direction, Mean | |
| Hip acceleration, Y-direction, Variance | |
| Hip acceleration, X-direction, Variance | |
| Wrist acceleration, Y-direction, Variance | |
| Wrist acceleration, X-direction, Mean | |

The classification in the phase 503 can be, for example, the minimum-distance classification that represents a rather straightforward way to accomplish the classification of the vector of feature values. The basic principle of the minimum-distance classification is to calculate distances from the vector of feature values to be classified to ideal feature vectors each of which representing a respective context class in the best possible way, and then to select the context class to the ideal feature vector of which the distance is smallest. The distances can be defined in the sense of a suitable vector norm, e.g. the 2-norm. If the feature values are represented in an N-dimensional vector space then there will be N−1 dimensional hyperplane separating each context class. In such case, e.g. a mean value of representative vectors of feature values belonging to a certain context class can be used as the ideal feature vector of that context class.

The algorithm used in the classification can be adapted to correspond better to the specific needs of the user on the basis of the vector of feature values to be classified and feedback information given by the user. The feedback can be direct feedback which explicitly indicates the desired context class for certain sensing data and for the corresponding vector of feature values. The user may therefore, through the direct feedback, assist and cultivate the classification algorithm when the user sees it appropriate. As the user directly indicates the desired context class, it is not necessary to execute an automated classification round for the corresponding vector of feature values. Instead, the classification may utilize the data and/or the corresponding feature values for adapting the classification algorithm. In addition to or as an alternative of the direct feedback, the algorithm used in the classification can be adapted on the basis of indirect feedback given by the user. The indirect feedback is feedback which is obtained after the classification action as indication of the quality and correctness of the automatically performed classification. The indirect feedback may indicate, for example one of the following alternatives: the user is highly satisfied with the outcome of the classification, the user is satisfied with the outcome of the classification, the user is dissatisfied with the outcome of the classification, and the user is highly dissatisfied with the outcome of the classification.

In conjunction with the minimum-distance classification algorithm, the adaptation phase 506 may comprise moving the ideal feature vector of the context class determined by the classification or by the direct feedback closer to or farther away from the vector of feature values to be classified, the direction of the movement depending on the feedback information. A more detailed description of the adaptation of the minimum-distance classification algorithm can be found e.g. in FI20095570.

Figure 6:
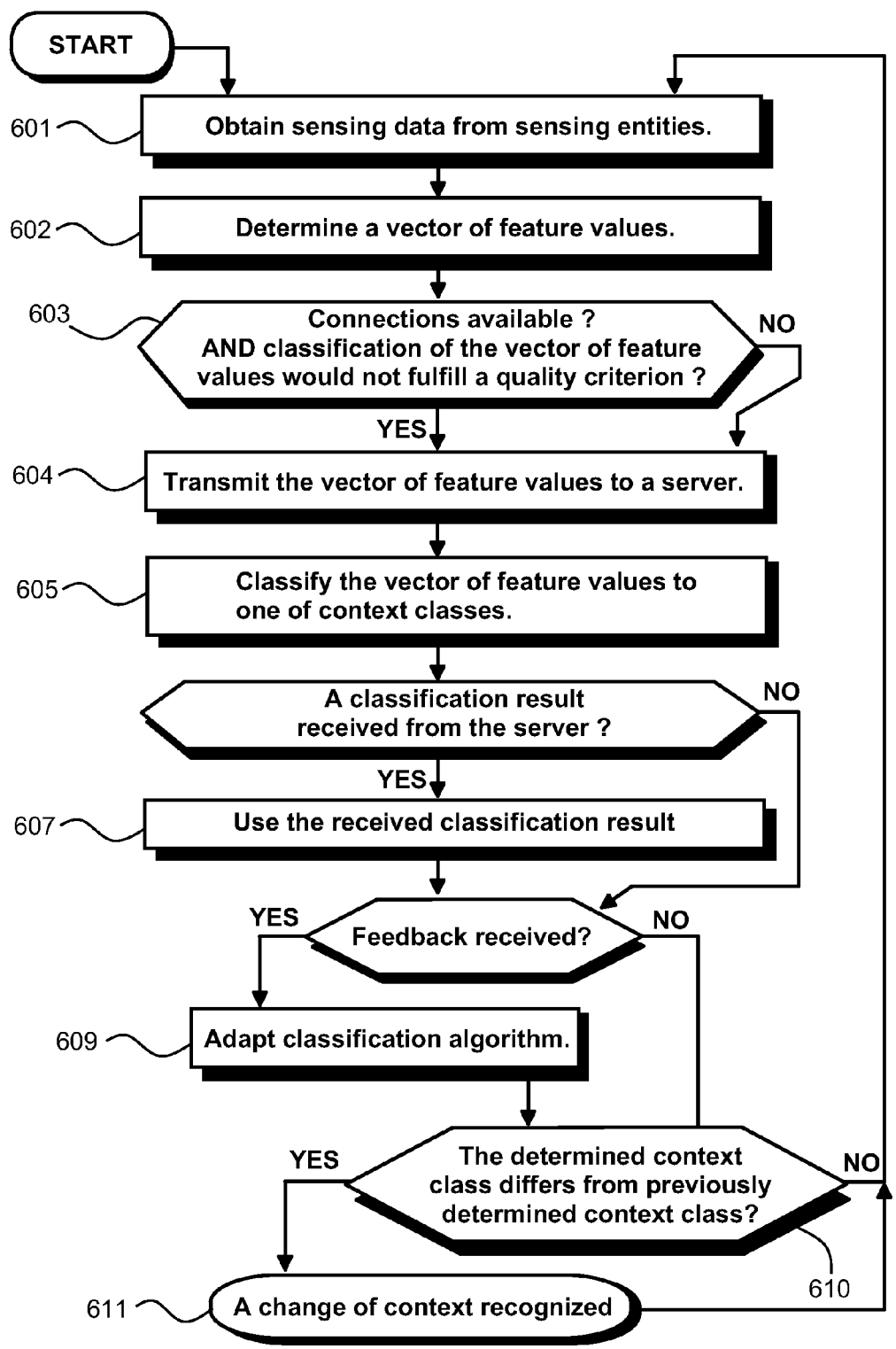
FIG. 6 shows a flow chart of a recognizing method for recognizing a change of context, the recognizing method being usable in a method according to an embodiment of the invention for controlling a mobile device on the basis of context awareness.

FIG. 6 shows a flow chart of a recognizing method for recognizing a change of context. The recognizing method is usable in a method according to an embodiment of the invention for controlling a mobile device on the basis of context awareness. The recognizing method shown in FIG. 6 can be used, for example, as the phases 101, 201, 301, and 401 of the methods illustrated in FIGS. 1-4. The recognizing method illustrated in FIG. 6 is a further development of the recognizing method illustrated in FIG. 5. In the recognizing method illustrated in FIG. 6, a server device is asked to assist in the classification if data transfer connections to and from the server device are available and if the classification task might be too complicated for being performed by the mobile device in a reasonable time with a sufficient quality. Even though the assistance has been asked, the classification is preferably carried out in the mobile device in order not to be dependent on whether or not the server device provides a classification result within a sufficiently short time. The recognizing of the change of context comprises:

obtaining, in a phase 601, sensing data from the sensing entities, determining, in a phase 602, a vector of feature values on the basis of the sensing data provided by the sensing entities, checking, in a phase 603, whether classification of the vector of feature values would fulfill a pre-determined quality criterion and whether the data transfer connections to and from the server device are available, as a response to a situation in which the data transfer connections are available and the classification would not fulfill the pre-determined quality criterion, transmitting in a phase 604 the vector of feature values to the server device in order to enable the server device to classify the vector of feature values to one of pre-defined alternative context classes, classifying, in an optional but non-necessary phase 605, the vector of feature values to one of the pre-defined alternative context classes in order not to be dependent on whether or not the server device provides a classification result, as a response to receiving a classification result from the server device, using in a phase 607 the classification result received from the server device for determining whether the change of context has taken place.

The classification result, i.e. a determined context class, received from the server device is preferably used for determining whether or not a change of context has occurred. However, if the user of the mobile device gives a context class, e.g. as feedback information, this context class given by the user is preferably used for determining whether or not the change of context has occurred. The phases 609, 610, and 611 of the recognizing method illustrated in FIG. 6 can be similar to the corresponding phases 506, 507, and 508 of the recognizing method illustrated in FIG. 5, respectively.

In a recognizing method according to an embodiment, the phase 603 comprises calculating the minimum of distances between the vector of feature values and the ideal feature vector of the alternative context classes in order to check whether the classification of the vector of feature values would fulfill the pre-determined quality criterion. The quality criterion can be, for example, such that the minimum of the distances should be below a pre-determined limit value. The distances can be defined in the sense of a suitable vector norm, e.g. the 2-norm.

In a recognizing method according to an embodiment, the phase 604 further comprises transmitting to the server device the ideal feature vector of one or more of the context classes in order to enable the server device to classify the vector of feature values to one of the alternative context classes in a same manner as the classification is carried out in the mobile device.

It should be noted that the applicability of the recognizing method illustrated in FIG. 6 is not limited to the methods illustrated in FIGS. 1-4, but the recognizing method illustrated in FIG. 6 can be used in various situations where the context and/or the change of context needs to be recognized. The same is valid also for a device, e.g. a processing system, arranged execute the recognizing method illustrated in FIG. 6 and also for a computer program comprising computer executable instructions for controlling a programmable processor to execute the recognizing method illustrated in FIG. 6.

Figure 7:
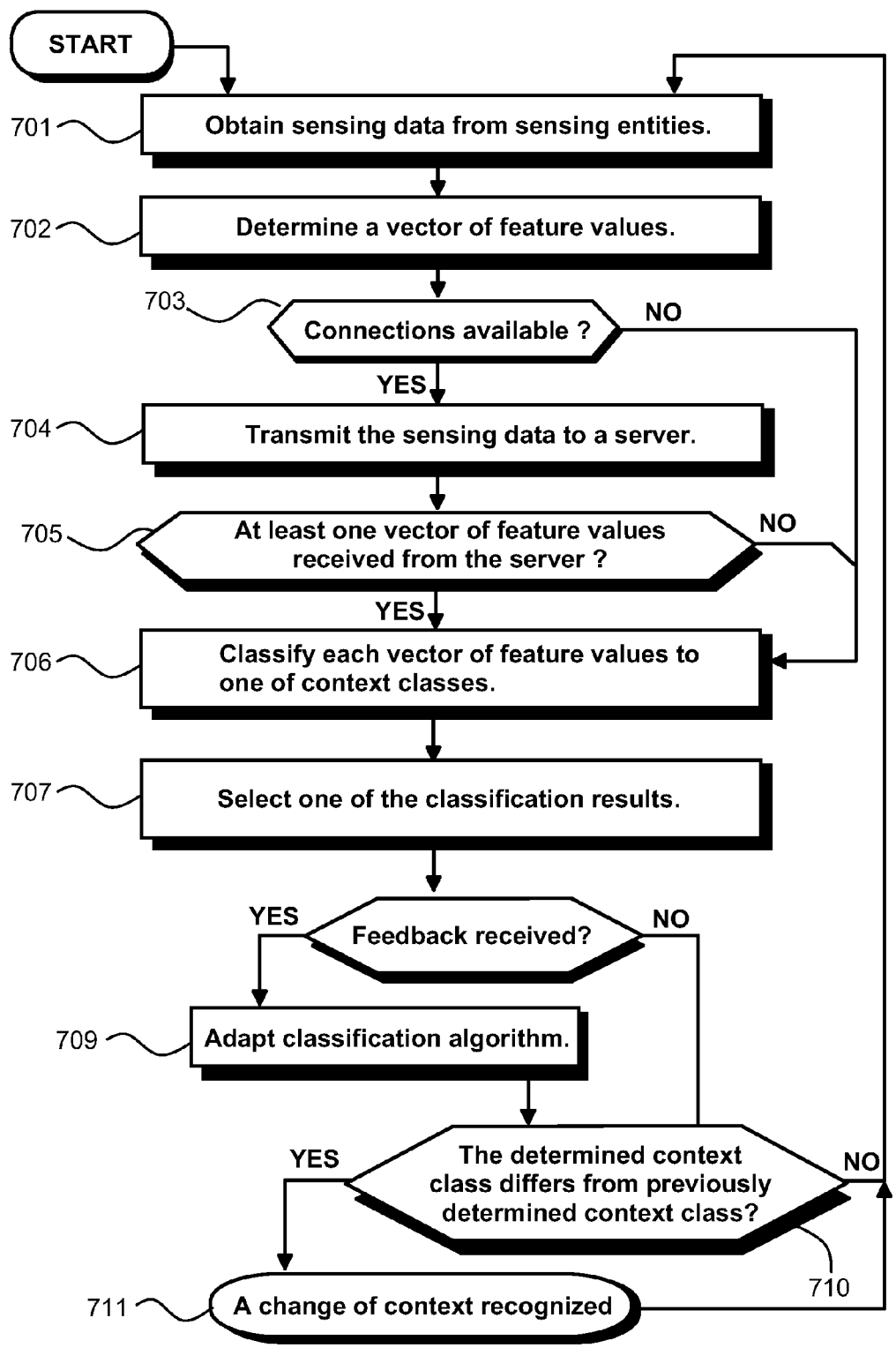
FIG. 7 shows a flow chart of a recognizing method for recognizing a change of context, the recognizing method being usable in a method according to an embodiment of the invention for controlling a mobile device on the basis of context awareness.

FIG. 7 shows a flow chart of a recognizing method for recognizing a change of context. The recognizing method is usable in a method according to an embodiment of the invention for controlling a mobile device on the basis of context awareness. The recognizing method shown in FIG. 7 can be used, for example, as the phases 101, 201, 301, and 401 of the methods illustrated in FIGS. 1-4. The recognizing method illustrated in FIG. 7 is a further development of the recognizing method illustrated in FIG. 5. In the recognizing method illustrated in FIG. 7, a server device is asked to provide additional and/or improved feature values if data transfer connections to and from the server device are available. The recognizing of the change of context comprises:

obtaining, in a phase 701, sensing data from the sensing entities, determining, in a phase 702, a vector of feature values on the basis of the sensing data provided by the sensing entities, checking, in a phase 703, whether the data transfer connections to and from the server device are available, as a response to a situation in which the data transfer connection is available, transmitting in a phase 704 information based on the sensing data to a server device in order to enable the server device to form at least one second vector of feature values, and as a response to receiving the at least one second vector of feature values from the server device, using in phases 706 and 707 each second vector of feature values for determining whether the change of context has taken place.

Each second vector of feature values may represent a complemented and/or more focused, i.e. augmented, version of the vector of feature values determined in the mobile device in the phase 702. Even though the one or more second vectors of the feature values has been asked from the server device, also the vector of feature values determined in the phase 702 is preferably classified in the mobile device in order not to be dependent on whether or not the server device provides the one or more second vectors of feature values within a sufficiently short time. Each second vector of feature values is preferably associated with a time limit after which that particular second vector of feature values is no longer valid. Each second vector of feature values is used for determining whether the change of context has taken place only if that particular second vector of feature values is still valid.

In a method according to an embodiment, the phase 707 comprises selecting one of the context classes determined in the phase 706 by:

the classification of the vector of feature values, and the classification of each of the at least one second vector of feature values.

The change of context is present, a result phase 711, when the selected context class differs, in a decision phase 710, from the previously determined context class. The selected context class can be defined to be the one which has a smallest distance between its ideal feature vector and a corresponding vector of feature values which has been classified to that context class, i.e. the context class having the best match between its ideal feature vector and a corresponding vector of feature values is the selected context class.

It is also possible that the server device sends to the mobile terminal, in addition to or instead of the one or more second feature vectors, classification data indicating one or more context classes determined by one or more classifications carried out in the server device. In a method according to an embodiment, the phase 707 comprises selecting, as a response to receiving from the server device the above-mentioned classification data, one of:

the context class determined by the classification of the vector of feature values, and the one or more context classes determined by the classifications of the at least one second vector of feature values, and/or the one or more context classes determined by the one or more classifications carried out in the server device.

The change of context is present, a result phase 711, when the selected context class differs, in a decision phase 710, from the previously determined context class. The selected context class can be defined to be the one which has a smallest distance between its ideal feature vector and a corresponding vector of feature values which has been classified to that context class, i.e. the context class having the best match between its ideal feature vector and a corresponding vector of feature values is the selected context class. Each context class determined by the one or more classifications carried out in the server device is preferably associated with a time limit after which that particular context class is no longer valid. Each context class determined by the one or more classifications carried out in the server device is used for determining whether the change of context has taken place only if that particular context class is still valid.

It should be noted that the applicability of the recognizing method illustrated in FIG. 7 is not limited to the methods illustrated in FIGS. 1-4, but the recognizing method illustrated in FIG. 7 can be used in various situations where the context and/or the change of context needs to be recognized. The same is valid also for a device, e.g. a processing system, arranged execute the recognizing method illustrated in FIG. 7 and also for a computer program comprising computer executable instructions for controlling a programmable processor to execute the recognizing method illustrated in FIG. 7.

Figure 8:
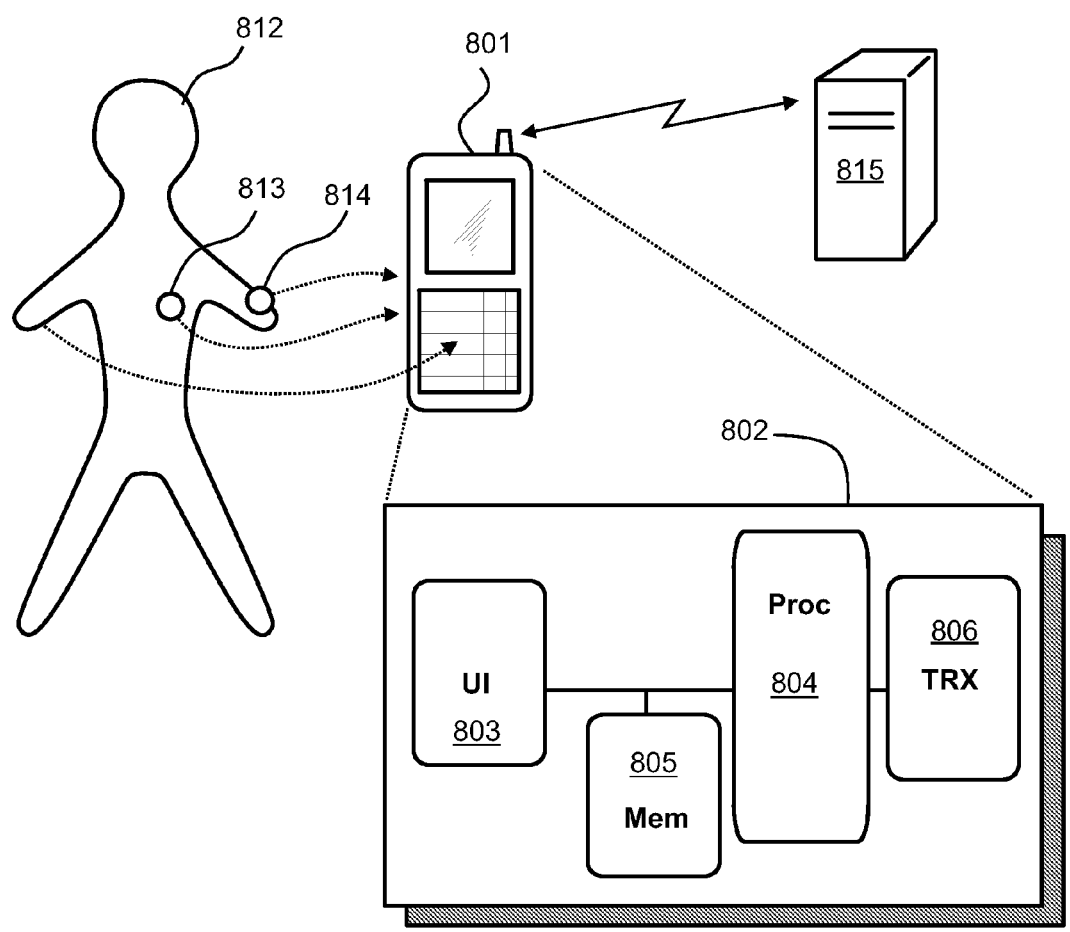
FIG. 8 shows a mobile device according to an embodiment of the invention.

FIG. 8 shows a mobile device 801 according to an embodiment of the invention. The mobile device can be, for example a mobile phone, a personal digital assistant (PDA), a smartphone, a lap-top computer, or a wrist-top device. The block 802 represents the internals of the mobile device. The mobile device comprises a processing system 804 arranged to:

recognize a change of context related to the mobile device and/or a user 812 of the mobile device, gather usage data indicative of control actions given by the user and directed to the mobile device during different recognized changes of context, as a response to a recognized change of context, select at least one service action at least partly on the basis of the usage data, the at least one service action being selectable from among a pre-determined set of service actions related to services provided with the mobile device, and control the mobile device to perform the selected at least one service action.

The processing system 804 may comprise one or more processing units each of which may be a programmable processor, a dedicated circuit such as an application specific integrated circuit (ASIC), or a configurable circuit such as a field programmable gate array (FPGA). Preferably, the mobile device further comprises a transceiver 806, a user interface 803, and a memory device 805.

In a mobile device according to an embodiment of the invention, the processing system 804 is arranged to use, in addition to the usage data for the selection of the service action, history data indicative of control actions given by users of other mobile devices during different changes of context related to the other mobile devices and/or the users of the other mobile devices. The mobile device may comprise a data interface, e.g. a universal serial bus interface (USB), for downloading the history data from an external device, or a receiver for receiving the history data via a mobile communication network.

In a mobile device according to an embodiment of the invention, the processing system 804 is arranged analyze, with a data mining algorithm, correlations between different changes of context and different service actions from a data base comprising the usage data. The data base may further comprise the history data.

A mobile device according to an embodiment of the invention comprises one or more sensing entities for obtaining sensing data indicative of the context related to the mobile device and/or the user of the mobile device. The mobile device may comprise, in addition to or instead of the sensing entities, a data interface for receiving, from one or more external device, sensing data indicative of the context related to the mobile device and/or the user of the mobile device. The external devices can be, for example, sensors 813 and 814 attached to the user. A sensor attached to the user can be e.g. an accelerometer, a temperature sensor, or a pulse/heart rate sensor. The processing system 804 is arranged to recognize the change of context on the basis of the sensing data.

In a mobile device according to an embodiment of the invention, the processing system 804 is arranged, for recognizing the change of context, to:

determine a vector of feature values on the basis of the sensing data, and classify the vector of feature values to one of alternative context classes, the change of context being present when the context class determined by the classification of the vector of feature values differs from a previously determined context class.

In a mobile device according to an embodiment of the invention, the processing system 804 is arranged to adapt an algorithm used in the classification on the basis of the vector of feature values and feedback information given by the user.

In a mobile device according to an embodiment of the invention, the processing system 804 is arranged to adapt the algorithm so that an ideal feature vector of the context class determined by the classification is moved, depending on the feedback information, closer to or farther away from the vector of feature values. The ideal feature vector of each context class is such a vector of feature values that best matches with that particular context class and the context class determined by the classification is the one whose ideal feature vector is closest to the vector of feature values in the sense of a pre-determined vector norm.

In a mobile device according to an embodiment of the invention, the processing system 804 is arranged to:

check whether classification of the vector of feature values would fulfill a pre-determined quality criterion, check availability of data transfer connections to and from a server device 815, as a response to a situation in which the data transfer connections are available and the classification would not fulfill the pre-determined quality criterion, transmit the vector of feature values to the server device in order to enable the server device to classify the vector of feature values to one of the alternative context classes, and as a response to receiving a classification result from the server device, use the classification result received from the server device for determining whether the change of context has taken place.

In a mobile device according to an embodiment of the invention, the processing system 804 is arranged to calculate the minimum of distances between the vector of feature values and ideal feature vectors of the alternative context classes in order to check whether the classification of the vector of feature values would fulfill the pre-determined quality criterion. The distances can be defined in the sense of a pre-determined vector norm, e.g. the 2-norm.

In a mobile device according to an embodiment of the invention, the processing system 804 is arranged to transmit to the server device the ideal feature vector of one or more of the context classes in order to enable the server device to classify the vector of feature values to one of the alternative context classes in a same manner as the classification is carried out by the mobile device.

In a mobile device according to an embodiment of the invention, the processing system 804 is arranged to recognize the change of context on the basis of whether a context class given by the user differs from the previously determined context class.

In a mobile device according to an embodiment of the invention, the processing system 804 is arranged to:

check availability of the data transfer connections to and from the server device 815, as a response to a situation in which the data transfer connections are available, transmit information based on the sensing data to a server device in order to enable the server device to form at least one second vector of feature values, and as a response to receiving the at least one second vector of feature values from the server device, use each second vector of feature values for determining whether the change of context has taken place.

In a mobile device according to an embodiment of the invention, the processing system 804 is arranged to select one of the context classes determined by:

the classification of the vector of feature values, and the classification of each of the at least one second vectors of feature values, and/or one or more classifications carried out in the server device.

The change of context is deemed to be present when the selected context class differs from the previously determined context class. The selected context class may be defined to be the one which has a smallest distance between its ideal feature vector and a corresponding vector of feature values which has been classified to that context class. Each second vector of feature values is preferably associated with a time limit, i.e. time-to-live, after which that particular second vector of feature values is no longer valid. The processing system is preferably arranged to use each second vector of feature values for determining whether the change of context has taken place only if that particular second vector of feature values is still valid. Furthermore, each context class determined by a classification carried out in the server device is preferably associated with a corresponding time limit after which that particular context class is no longer valid, and the processing system is preferably arranged to use each context class for determining, whether the change of context has taken place, only if that particular context class is still valid.

A computer program according to an embodiment of the invention comprises a program code for controlling a mobile device on the basis of context awareness. The program code comprises instructions executable by a programmable processor for controlling the programmable processor to:

recognize a change of context related to the mobile device and/or a user of the mobile device, gather usage data indicative of control actions given by the user and directed to the mobile device during different recognized changes of context, as a response to a recognized change of context, select at least one service action at least partly on the basis of the usage data, the at least one service action being selectable from among a pre-determined set of service actions related to services provided with the mobile device, and control the mobile device to perform the selected at least one service action.

The computer executable instructions can be e.g. subroutines and/or functions.

A computer readable medium, e.g. a CD-ROM (Compact Disc Read Only Memory) or a RAM-device (Random Access Memory), according to an embodiment of the invention is encoded with a computer program according to an embodiment of the invention.

A signal according to an embodiment of the invention is encoded with a computer program according to an embodiment of the invention.

The specific examples provided in the description given above should not be construed as limiting. Therefore, the invention is not limited merely to the embodiments described above, many variants being possible.

What is claimed is:

1. A mobile device comprising:
one or more sensing entities for obtaining sensing data indicative of context related to the mobile device and/or a user of the mobile device, and
a processing system arranged to:
recognize, on the basis of the sensing data, a change of context related to the mobile device and/or the user of the mobile device,
control the mobile device to perform at least one service action related to services provided with the mobile device as a response to a recognized change of context,
gather usage data indicative of control actions given by the user and directed to the mobile device during time intervals after different recognized changes of context, the time intervals for gathering the usage data having pre-determined temporal lengths, and
select, prior to performing the at least one service action, the at least one service action from among a pre-determined set of service actions at least partly on the basis of the usage data, wherein the processing system is arranged, for recognizing the change of context, to:
determine a vector of feature values on the basis of the sensing data,
classify the vector of feature values to one of alternative context classes, the change of context being present when the context class determined by the classification of the vector of feature values differs from a previously determined context class,
check whether classification of the vector of feature values would fulfill a pre-determined quality criterion,
check availability of data transfer connections to and from a server device,
as a response to a situation in which the data transfer connections are available and the classification would not fulfill the pre-determined quality criterion, transmit the vector of feature values to the server device in order to enable the server device to classify the vector of feature values to one of the alternative context classes, and
as a response to receiving a classification result from the server device, use the classification result received from the server device for determining whether the change of context has taken place.

2. A mobile device according to claim 1, wherein the processing system is arranged to use, in addition to the usage data for the selection of the service action, history data indicative of control actions given by users of other mobile devices during different changes of context related to the other mobile devices and/or the users of the other mobile devices.

3. A mobile device according to claim 1, wherein the processing system is arranged analyze, with a data mining algorithm, correlations between different changes of context and different service actions from a data base comprising the usage data.

4. A mobile device according to claim 2, wherein the processing system is arranged analyze, with a data mining algorithm, correlations between different changes of context and different service actions from a data base comprising the usage data and the history data.

5. A mobile device according to claim 2, comprising a data interface for downloading the history data from an external device.

6. A mobile device according to claim 2, comprising a receiver for receiving the history data via a mobile communication network.

7. A mobile device according to claim 1, comprising a data interface for receiving, from one or more external device, sensing data indicative of the context related to the mobile device and/or the user of the mobile device, the processing system being arranged to recognize the change of context on the basis of the sensing data.

8. A mobile device according to claim 1, wherein the processing system is arranged to adapt an algorithm used in the classification on the basis of the vector of feature values and feedback information given by the user.

9. A mobile device according to claim 8, wherein the processing system is arranged to adapt the algorithm so that an ideal feature vector of the context class determined by the classification is moved, depending on the feedback information, closer to or farther away from the vector of feature values, the ideal feature vector of each context class being such a vector of feature values that best matches with that particular context class and the context class determined by the classification being the one whose ideal feature vector is closest to the vector of feature values in the sense of a pre-determined vector norm.

10. A mobile device according to claim 1, wherein the processing system is arranged to calculate the minimum of distances between the vector of feature values and ideal feature vectors of the alternative context classes in order to check whether the classification of the vector of feature values would fulfill the pre-determined quality criterion, the distances being defined in the sense of a pre-determined vector norm and the ideal feature vector of each context class being such a vector of feature values that best matches with that particular context class.

11. A mobile device according to claim 10, wherein the processing system is arranged to transmit to the server device the ideal feature vector of one or more of the context classes in order to enable the server device to classify the vector of feature values to one of the alternative context classes in a same manner as the classification is carried out by the mobile device.

12. A mobile device according to claim 1, wherein the processing system is arranged to recognize the change of context on the basis of whether a context class given by the user differs from the previously determined context class.

13. A mobile device according to claim 1, wherein the processing system is arranged to:
check availability of the data transfer connections to and from the server device,
as a response to a situation in which the data transfer connections are available, transmit information based on the sensing data to a server device in order to enable the server device to form at least one second vector of feature values, and
as a response to receiving the at least one second vector of feature values from the server device, use each second vector of feature values for determining whether the change of context has taken place.

14. A mobile device according to claim 13, wherein the processing system is arranged to select one of the context classes determined by:
the classification of the vector of feature values, and
the classification of each of the at least one second vectors of feature values,
the change of context being present when the selected context class differs from the previously determined context class.

15. A mobile device according to claim 13, wherein the processing system is arranged to select, as a response to receiving from the server device data indicating at least one context class determined by one or more classifications carried out in the server device, one of the context classes determined by:
the classification of the vector of feature values,
the classifications of the at least one second vector of feature values, and
the one or more classifications carried out in the server device,
the change of context being present when the selected context class differs from the previously determined context class.

16. A mobile device according to claim 14, wherein the selected context class is the one which has a smallest distance between its ideal feature vector and a corresponding vector of feature values which has been classified, the distance being defined in the sense of a pre-determined vector norm and the ideal feature vector of each context class being such a vector of feature values that best matches with that particular context class.

17. A mobile device according to claim 13, wherein each second vector of feature values is associated with a time limit after which that particular second vector of feature values is no longer valid, and the processing system is arranged to use each second vector of feature values for determining whether the change of context has taken place only if that particular second vector of feature values is still valid.

18. A mobile device according to claim 15, wherein each of the at least one context class determined by the one or more classifications carried out in the server device is associated with a time limit after which that particular context class is no longer valid, and the processing system is arranged to use each of the at least one context class determined by the one or more classifications carried out in the server device for determining, whether the change of context has taken place, only if that particular context class is still valid.

19. A method comprising:
obtaining, with one or more sensing entities, sensing data indicative of the context related to a mobile device and/or a user of the mobile device,
recognizing, on the basis of the sensing data, a change of context related to the mobile device and/or the user of the mobile device,
controlling the mobile device to perform at least one service action related to services provided with the mobile device as a response to a recognized change of context,
gathering usage data indicative of control actions given by the user and directed to the mobile device during time intervals after different recognized changes of context, the time intervals for gathering the usage data having predetermined temporal lengths, and
selecting, prior to performing the at least one service action, the at least one service action from among a pre-determined set of service actions at least partly on the basis of the usage data,
wherein the recognizing of the change of context comprises:
determining a vector of feature values on the basis of the sensing data,
classifying the vector of feature values to one of alternative context classes, the change of context being present when the context class determined by the classification of the vector of feature values differs from a previously determined context class,
checking whether classification of the vector of feature values would fulfill a pre-determined quality criterion,
checking availability of data transfer connections to and from a server device,
as a response to a situation in which the data transfer connections are available and the classification would not fulfill the pre-determined quality criterion, transmitting the vector of feature values to the server device in order to enable the server device to classify the vector of feature values to one of the alternative context classes, and
as a response to receiving a classification result from the server device, using the classification result received from the server device for determining whether the change of context has taken place.

20. A method according to claim 19, wherein the at least one service action is selected using, in addition to the usage data, history data indicative of control actions given by users of other mobile devices during different changes of context related to the other mobile devices and/or the users of the other mobile devices.

21. A method according to claim 19, comprising analyzing, with a data mining algorithm, correlations between different changes of context and different service actions from a data base comprising the usage data.

22. A method according to claim 20, comprising analyzing, with a data mining algorithm, correlations between different changes of context and different service actions from a data base comprising the usage data and the history data.

23. A method according to claim 20, comprising downloading the history data from an external device.

24. A method according to claim 20, comprising receiving the history data via a mobile communication network.

25. A method according to claim 19, comprising receiving, from one or more external device, sensing data indicative of the context related to the mobile device and/or the user of the mobile device, the change of context being recognized on the basis of the sensing data.

26. A method according to claim 19, comprising adapting an algorithm used in the classification on the basis of the vector of feature values and feedback information given by the user.

27. A method according to claim 26, wherein the algorithm is adapted so that an ideal feature vector of the context class determined by the classification is moved, depending on the feedback information, closer to or farther away from the vector of feature values, the ideal feature vector of each context class being such a vector of feature values that best matches with that particular context class and the context class determined by the classification being the one whose ideal feature vector is closest to the vector of feature values in the sense of a pre-determined vector norm.

28. A method according to claim 19, comprising calculating the minimum of distances between the vector of feature values and ideal feature vectors of the alternative context classes in order to check whether the classification of the vector of feature values would fulfill the pre-determined quality criterion, the distances being defined in the sense of a pre-determined vector norm and the ideal feature vector of each context class being such a vector of feature values that best matches with that particular context class.

29. A method according to claim 28, comprising transmitting to the server device the ideal feature vector of one or more of the context classes in order to enable the server device to classify the vector of feature values to one of the alternative context classes in a same manner as the classification is carried out in the mobile device.

30. A method according to claim 19, comprising recognizing the change of context on the basis of whether a context class given by the user differs from the previously determined context class.

31. A method according to claim 19, wherein the recognizing of the change of context comprises:
   checking availability of data transfer connections to and from the server device,
   as a response to a situation in which the data transfer connection is available, transmitting information based on the sensing data to a server device in order to enable the server device to form at least one second vector of feature values, and
   as a response to receiving the at least one second vector of feature values from the server device, using each second vector of feature values for determining whether the change of context has taken place.

32. A method according to claim 31, comprising selecting one of the context classes determined by:
   the classification of the vector of feature values, and
   the classification of each of the at least one second vector of feature values,
   the change of context being present when the selected context class differs from the previously determined context class.

33. A method according to claim 31, comprising selecting, as a response to receiving from the server device data indicating at least one context class determined by one or more classifications carried out in the server device, one of the context classes determined by:
   the classification of the vector of feature values,
   the classifications of the at least one second vector of feature values, and
   the one or more classifications carried out in the server device,
   the change of context being present when the selected context class differs from the previously determined context class.

34. A method according to claim 32, wherein the selected context class is the one which has a smallest distance between its ideal feature vector and a corresponding vector of feature values which has been classified, the distance being defined in the sense of a pre-determined vector norm and the ideal feature vector of each context class being such a vector of feature values that best matches with that particular context class.

35. A method according to claim 31, wherein each second vector of feature values is associated with a time limit after which that particular second vector of feature values is no longer valid, and each second vector of feature values is used for determining whether the change of context has taken place only if that particular second vector of feature values is still valid.

36. A method according to claim 33, wherein each of the at least one context class determined by the one or more classifications carried out in the server device is associated with a time limit after which that particular context class is no longer valid, and each of the at least one context class determined by the one or more classifications carried out in the server device is used for determining whether the change of context has taken place only if that particular context class is still valid.

37. A non-transitory computer readable medium encoded with a computer program comprising instructions executable by a programmable processor for controlling the programmable processor to:
   obtain, with one or more sensing entities, sensing data indicative of the context related to a mobile device and/or a user of the mobile device,
   recognize, on the basis of the sensing data, a change of context related to the mobile device and/or the user of the mobile device,
   control the mobile device to perform at least one service action related to services provided with the mobile device as a response to a recognized change of context,
   gather usage data indicative of control actions given by the user and directed to the mobile device during time intervals after different recognized changes of context, the time intervals for gathering the usage data having pre-determined temporal lengths, and
   select, prior to performing the at least one service action, the at least one service action from among a pre-determined set of service actions at least partly on the basis of the usage data,
   wherein the computer program further comprises, for recognizing of the change of context, instructions executable by the programmable processor for controlling the programmable processor to:
   determine a vector of feature values on the basis of the sensing data,
   classify the vector of feature values to one of alternative context classes, the change of context being present when the context class determined by the classification of the vector of feature values differs from a previously determined context class, check whether classification of the vector of feature values would fulfill a pre-determined quality criterion, check availability of data transfer connections to and from a server device, as a response to a situation in which the data transfer connections are available and the classification would not fulfill the pre-determined quality criterion, transmit the vector of feature values to the server device in order to enable the server device to classify the vector of feature values to one of the alternative context classes, and as a response to receiving a classification result from the server device, use the classification result received from the server device for determining whether the change of context has taken place.

38. A mobile device comprising one or more sensing entities for obtaining sensing data indicative of context related to the mobile device and/or a user of the mobile device, and a processing system arranged to:

recognize, on the basis of the sensing data, a change of the context related to the mobile device and/or the user of the mobile device, control the mobile device to perform at least one service action related to services provided with the mobile device as a response to a recognized change of context, gather usage data indicative of control actions given by the user and directed to the mobile device during time intervals after different recognized changes of context, the time intervals for gathering the usage data having pre-determined temporal lengths, and select, prior to performing the at least one service action, the at least one service action from among a pre-determined set of service actions at least partly on the basis of the usage data, wherein the processing system is arranged, for recognizing the change of context, to:

determine a vector of feature values on the basis of the sensing data, classify the vector of feature values to one of alternative context classes, the change of context being present when the context class determined by the classification of the vector of feature values differs from a previously determined context class, check availability of the data transfer connections to and from the server device, as a response to a situation in which the data transfer connections are available, transmit information based on the sensing data to a server device in order to enable the server device to form at least one second vector of feature values, and as a response to receiving the at least one second vector of feature values from the server device, use each second vector of feature values for determining whether the change of context has taken place, wherein each second vector of feature values is associated with a time limit after which that particular second vector of feature values is no longer valid, and the processing system is arranged to use each second vector of feature values for determining whether the change of context has taken place only if that particular second vector of feature values is still valid.

39. A mobile device comprising one or more sensing entities for obtaining sensing data indicative of context related to the mobile device and/or a user of the mobile device, and a processing system arranged to:

recognize, on the basis of the sensing data, a change of the context related to the mobile device and/or the user of the mobile device, control the mobile device to perform at least one service action related to services provided with the mobile device as a response to a recognized change of context, gather usage data indicative of control actions given by the user and directed to the mobile device during time intervals after different recognized changes of context, the time intervals for gathering the usage data having pre-determined temporal lengths, and select, prior to performing the at least one service action, the at least one service action from among a pre-determined set of service actions at least partly on the basis of the usage data, wherein the processing system is arranged, for recognizing the change of context, to:

determine a vector of feature values on the basis of the sensing data, classify the vector of feature values to one of alternative context classes, the change of context being present when the context class determined by the classification of the vector of feature values differs from a previously determined context class, check availability of the data transfer connections to and from the server device, as a response to a situation in which the data transfer connections are available, transmit information based on the sensing data to a server device in order to enable the server device to form at least one second vector of feature values, and as a response to receiving the at least one second vector of feature values from the server device, use each second vector of feature values for determining whether the change of context has taken place, and select, as a response to receiving from the server device data indicating at least one context class determined by one or more classifications carried out in the server device, one of the context classes determined by: (i) the classification of the vector of feature values, (ii) the classifications of the at least one second vector of feature values, and (iii) the one or more classifications carried out in the server device, where the change of context is present when the selected context class differs from the previously determined context class, wherein each of the at least one context class determined by the one or more classifications carried out in the server device is associated with a time limit after which that particular context class is no longer valid, and the processing system is arranged to use each of the at least one context class determined by the one or more classifications carried out in the server device for determining, whether the change of context has taken place, only if that particular context class is still valid.

40. A method comprising:

obtaining, with one or more sensing entities, sensing data indicative of context related to a mobile device and/or a user of the mobile device, recognizing, on the basis of the sensing data, a change of the context related to the mobile device and/or the user of the mobile device, controlling the mobile device to perform at least one service action related to services provided with the mobile device as a response to a recognized change of context, gathering usage data indicative of control actions given by the user and directed to the mobile device during time intervals after different recognized changes of context, the time intervals for gathering the usage data having pre-determined temporal lengths, and selecting, prior to performing the at least one service action, the at least one service action from among a pre-determined set of service actions at least partly on the basis of the usage data, wherein the recognizing the change of context comprises:

determining a vector of feature values on the basis of the sensing data, classifying the vector of feature values to one of alternative context classes, the change of context being present when the context class determined by the classification of the vector of feature values differs from a previously determined context class, checking availability of the data transfer connections to and from the server device, as a response to a situation in which the data transfer connections are available, transmitting information based on the sensing data to a server device in order to enable the server device to form at least one second vector of feature values, and as a response to receiving the at least one second vector of feature values from the server device, using each second vector of feature values for determining whether the change of context has taken place, wherein each second vector of feature values is associated with a time limit after which that particular second vector of feature values is no longer valid, and each second vector of feature values is used for determining whether the change of context has taken place only if that particular second vector of feature values is still valid.

41. A method comprising:

obtaining, with one or more sensing entities, sensing data indicative of context related to a mobile device and/or a user of the mobile device, recognizing, on the basis of the sensing data, a change of the context related to the mobile device and/or the user of the mobile device, controlling the mobile device to perform at least one service action related to services provided with the mobile device as a response to a recognized change of context, gathering usage data indicative of control actions given by the user and directed to the mobile device during time intervals after different recognized changes of context, the time intervals for gathering the usage data having pre-determined temporal lengths, and selecting, prior to performing the at least one service action, the at least one service action from among a pre-determined set of service actions at least partly on the basis of the usage data, wherein the recognizing the change of context comprises:

determining a vector of feature values on the basis of the sensing data, classifying the vector of feature values to one of alternative context classes, the change of context being present when the context class determined by the classification of the vector of feature values differs from a previously determined context class, checking availability of the data transfer connections to and from the server device, as a response to a situation in which the data transfer connections are available, transmitting information based on the sensing data to a server device in order to enable the server device to form at least one second vector of feature values, and as a response to receiving the at least one second vector of feature values from the server device, using each second vector of feature values for determining whether the change of context has taken place, and selecting, as a response to receiving from the server device data indicating at least one context class determined by one or more classifications carried out in the server device, one of the context classes determined by: (i) the classification of the vector of feature values, (ii) the classifications of the at least one second vector of feature values, and (iii) the one or more classifications carried out in the server device, where the change of context is present when the selected context class differs from the previously determined context class, wherein each of the at least one context class determined by the one or more classifications carried out in the server device is associated with a time limit after which that particular context class is no longer valid, and each of the at least one context class determined by the one or more classifications carried out in the server device is used for determining, whether the change of context has taken place, only if that particular context class is still valid.

42. A non-transitory computer readable medium encoded with a computer program comprising instructions executable by a programmable processor for controlling the programmable processor to run a method comprising:

obtaining, with one or more sensing entities, sensing data indicative of context related to a mobile device and/or a user of the mobile device, recognizing, on the basis of the sensing data, a change of the context related to the mobile device and/or the user of the mobile device, controlling the mobile device to perform at least one service action related to services provided with the mobile device as a response to a recognized change of context, gathering usage data indicative of control actions given by the user and directed to the mobile device during time intervals after different recognized changes of context, the time intervals for gathering the usage data having pre-determined temporal lengths, and selecting, prior to performing the at least one service action, the at least one service action from among a pre-determined set of service actions at least partly on the basis of the usage data, wherein the recognizing the change of context comprises:

determining a vector of feature values on the basis of the sensing data, classifying the vector of feature values to one of alternative context classes, the change of context being present when the context class determined by the classification of the vector of feature values differs from a previously determined context class, checking availability of the data transfer connections to and from the server device, as a response to a situation in which the data transfer connections are available, transmitting information based on the sensing data to a server device in order to enable the server device to form at least one second vector of feature values, and as a response to receiving the at least one second vector of feature values from the server device, using each second vector of feature values for determining whether the change of context has taken place, wherein each second vector of feature values is associated with a time limit after which that particular second vector of feature values is no longer valid, and each second vector of feature values is used for determining whether the change of context has taken place only if that particular second vector of feature values is still valid.

43. A non-transitory computer readable medium encoded with a computer program comprising instructions executable by a programmable processor for controlling the programmable processor to run a method comprising:

obtaining, with one or more sensing entities, sensing data indicative of context related to a mobile device and/or a user of the mobile device, recognizing, on the basis of the sensing data, a change of the context related to the mobile device and/or the user of the mobile device, controlling the mobile device to perform at least one service action related to services provided with the mobile device as a response to a recognized change of context, gathering usage data indicative of control actions given by the user and directed to the mobile device during time intervals after different recognized changes of context, the time intervals for gathering the usage data having pre-determined temporal lengths, and selecting, prior to performing the at least one service action, the at least one service action from among a pre-determined set of service actions at least partly on the basis of the usage data, wherein the recognizing the change of context comprises:

determining a vector of feature values on the basis of the sensing data, classifying the vector of feature values to one of alternative context classes, the change of context being present when the context class determined by the classification of the vector of feature values differs from a previously determined context class, checking availability of the data transfer connections to and from the server device, as a response to a situation in which the data transfer connections are available, transmitting information based on the sensing data to a server device in order to enable the server device to form at least one second vector of feature values, and as a response to receiving the at least one second vector of feature values from the server device, using each second vector of feature values for determining whether the change of context has taken place, and selecting, as a response to receiving from the server device data indicating at least one context class determined by one or more classifications carried out in the server device, one of the context classes determined by: (i) the classification of the vector of feature values, (ii) the classifications of the at least one second vector of feature values, and (iii) the one or more classifications carried out in the server device, where the change of context is present when the selected context class differs from the previously determined context class, wherein each of the at least one context class determined by the one or more classifications carried out in the server device is associated with a time limit after which that particular context class is no longer valid, and each of the at least one context class determined by the one or more classifications carried out in the server device is used for determining, whether the change of context has taken place, only if that particular context class is still valid.

* * * * *